US010432306B2

(12) United States Patent
Eiselt

(10) Patent No.: US 10,432,306 B2
(45) Date of Patent: Oct. 1, 2019

(54) METHOD AND APPARATUS FOR MEASUREMENT OF A BACKSCATTERED TRACE OF A FIBER

(71) Applicant: ADVA Optical Networking SE, Meiningen OT Dreissigacker (DE)

(72) Inventor: Michael Eiselt, Kirchheim (DE)

(73) Assignee: ADVA OPTICAL NETWORKS SE, Meiningen Ot Dreissigacker (DE)

( * ) Notice: Subject to any disclaimer, the term of this patent is extended or adjusted under 35 U.S.C. 154(b) by 0 days.

(21) Appl. No.: 15/965,815

(22) Filed: Apr. 27, 2018

(65) Prior Publication Data
US 2018/0331756 A1    Nov. 15, 2018

(30) Foreign Application Priority Data

May 12, 2017  (EP) .................................... 17170793

(51) Int. Cl.
| H04B 10/079 | (2013.01) |
| G01M 11/00 | (2006.01) |
| H04B 10/071 | (2013.01) |
| H04B 10/25 | (2013.01) |
| H04J 14/02 | (2006.01) |

(52) U.S. Cl.
CPC ..... H04B 10/0797 (2013.01); G01M 11/3145 (2013.01); H04B 10/071 (2013.01); H04B 10/07955 (2013.01); H04B 10/25 (2013.01); H04J 14/02 (2013.01)

(58) Field of Classification Search
CPC .............. H04B 10/0797; H04B 10/071; H04B 10/07955; H04B 10/25; G01M 11/3145
USPC ............................................ 398/15, 16, 9, 1
See application file for complete search history.

(56) References Cited

U.S. PATENT DOCUMENTS

| 4,893,006 A * | 1/1990 | Wakai ................ G01M 11/3145 |
| | | 250/227.11 |
| 6,661,963 B2 | 12/2003 | Sharp et al. |
| 2005/0271384 A1 | 12/2005 | Lee et al. |
| 2008/0231842 A1* | 9/2008 | Brendel ............. G01M 11/3145 |
| | | 356/73.1 |
| 2008/0316494 A1 | 12/2008 | Hartog et al. |
| 2009/0310627 A1* | 12/2009 | Chen ...................... H01S 5/146 |
| | | 372/6 |

(Continued)

FOREIGN PATENT DOCUMENTS

EP    2 741 432 A1    6/2014

OTHER PUBLICATIONS

Communication of the extended European search report Europen Application No. 17170793.8 (dated Nov. 2, 2017).

Primary Examiner — Oommen Jacob
(74) Attorney, Agent, or Firm — Jenkins, Wilson, Taylor & Hunt, P.A.

(57) ABSTRACT

An optical time-domain reflectometer, OTDR, apparatus is configured to measure a backscattered trace of a fiber link under test (FLUT). The OTDR apparatus includes at least one photo diode adapted to detect an optical signal reflected from points along the fiber link under test in response to an optical test signal generated by a laser of the OTDR apparatus and supplied to the fiber link under test. The reflected optical test signal is attenuated or amplified automatically such that the power of the optical signal received by the photodiode is limited to a predetermined power range.

13 Claims, 4 Drawing Sheets

(56) References Cited

U.S. PATENT DOCUMENTS

| | | | |
|---|---|---|---|
| 2010/0271622 A1* | 10/2010 | Hori | G01M 11/3145 356/73.1 |
| 2011/0233385 A1* | 9/2011 | Dyer | H01L 31/02027 250/214 R |
| 2015/0253217 A1* | 9/2015 | Gurusami | G01M 11/3127 356/73.1 |
| 2018/0331756 A1* | 11/2018 | Eiselt | H04B 10/071 |

* cited by examiner

METHOD AND APPARATUS FOR MEASUREMENT OF A BACKSCATTERED TRACE OF A FIBER

PRIORITY CLAIM

This application claims the benefit of European Patent Application No. 17170793.8, filed May 12, 2017, the disclosure of which is incorporated herein by reference in its entirety.

TECHNICAL FIELD

The invention relates to a method and apparatus for measuring a backscattered trace of a fiber link under test FLUT in response to an optical test signal applied to said fiber link under test.

BACKGROUND

An optical time-domain reflectometer (OTDR) is an optoelectronic instrument and can be used to characterize an optical fiber. In optical time-domain reflectometry short optical pulses are transmitted into an optical fiber and the backscattered power can be measured as a function of time. From the recorded time trace a spatial distribution of backscattering and attenuation can be derived. As the backscattered power P is relatively low and distributed over time an optical time-domain reflectometer requires a sensitive receiver. For this purpose usually an avalanche photo diode (APD) is used as a receiving element of the optical time-domain reflectometer. The strength of the returned optical pulses can be measured and integrated as a function of time. When a strong optical signal is received resulting from a high reflection point along the optical fiber under test FLUT the photo diode of the optical time-domain reflectometer can become saturated and is then not able to detect further optical signals for some time. Further any lower reflection close to the high reflection point cannot be detected.

FIG. 1 shows a conventional setup of an optical time-domain reflectometer. The OTDR shown in FIG. 1 comprises a laser which can generate a short optical pulse which is transmitted into the optical fiber under test FLUT. The generated short optical pulse generated by the laser can be sent via an optical circulator and a wavelength division multiplexer (WDM) into the optical fiber under test. The optical pulse propagates in the optical fiber under test and a fraction of its power is constantly scattered. This results in a loss of the pulse power. The scattered power captured by the optical fiber propagates in reverse direction towards the wavelength division multiplexer WDM. At the wavelength division multiplexer WDM the scattered optical power is directed via the circulator of the optical time-domain reflectometer OTDR apparatus towards a photo diode of the OTDR apparatus. The photo diode recalls the time evolution of the received backscattered power, from which a location of larger reflections can be derived as well as the attenuation of the power along the fiber link under test FLUT. When a strong optical signal from a high reflection point is detected by the photo diode the photo diode can become saturated and is no longer able to detect further optical signal for some time. Typically a high reflection point can be located at the launch point of the optical pulse, i.e. at the wavelength division multiplexer, but high reflection points can be located at any point along the optical fiber under test FLUT.

FIG. 2 shows a typical backscattered trace of a fiber link under test FLUT where a broad pulse at the launch point indicates saturation of the photo diode and the corresponding resulting dead zone. As also shown in FIG. 2 there is a strong reflectance of a connector, likewise leading to a dead zone in the backscattered trace of the fiber link under test FLUT. Accordingly an OTDR dead zone DZ refers to a distance (or time) where the optical time-domain reflectometer cannot detect or precisely localize any event or artefact on the fiber link under test FLUT. An OTDR dead zone DZ is always prominent at the beginning of a trace or at any other high reflection point.

Accordingly there is a need to provide a method and apparatus for measurement of a backscattered trace of a fiber link under test where quality and precision of the measurement is increased.

SUMMARY

The invention provides according to a first aspect a method for measuring a backscattered trace of a fiber link under test in response to an optical test signal supplied to the fiber link under test reflected back from points along said fiber link under test and received by a photo diode, wherein the reflected optical test signal is attenuated or amplified such that the power of the optical signal received by the photo diode is limited to a predetermined power range.

An advantage of the method according to the first aspect of the present invention results in that the power range received by the photo diode is limited to be less than a maximum value in order to avoid a saturation of the photo diode thus avoiding dead zones.

A further advantage of the method according to the first aspect of the present invention results in that the power range received by the photo diode is further limited to be not less than a minimum value to maintain a sufficient signal to noise ratio of the received signal at the photo diode.

In a further possible embodiment of the method according to the first aspect of the present invention the predetermined power range comprises as an upper power limit a maximum power which is adjusted to suppress dead zones within the backscattered trace of the fiber link under test caused by saturation of the photo diode in response to the optical signal received by the photo diode.

In a further possible embodiment of the method according to the first aspect of the present invention the predetermined power range comprises as a lower power limit a minimum power which is adjusted to maintain a minimum signal to noise ratio of the optical signal received by the photo diode.

In a still further possible embodiment of the method according to the first aspect of the present invention the reflected optical signal is adjusted by a variable optical attenuator and/or by a variable semiconductor optical amplifier which are controlled depending on the signal strength of the optical signal received by the photo diode.

In a still further possible embodiment of the method according to the first aspect of the present invention an attenuation of the variable optical attenuator and/or a gain of the semiconductor optical amplifier is adjusted iteratively depending on a measured backscattered power to maintain the power of the optical signal received by said photo diode constant within the predetermined power range.

In a still further possible embodiment of the method according to the first aspect of the present invention a control voltage and/or a control current of the photo diode is controlled depending on a signal strength of the optical signal received by said photo diode.

In a still further possible embodiment of the method according to the first aspect of the present invention the photo diode comprises an avalanche photo diode wherein an avalanche control voltage of the avalanche photo diode is changed automatically depending on the signal strength of the optical signal received by said photo diode.

In a further possible embodiment of the method according to the first aspect of the present invention the photo diode converts the received optical signal into an electrical current supplied to a processor which evaluates power backscattered by the fiber link under test to provide the backscattered trace of the fiber link under test indicating a spatial distribution of the backscattered power.

In a further possible embodiment of the method according to the first aspect of the present invention optical pulses are transmitted from a laser via an optical circulator and a wavelength division multiplexer into the fiber link under test to provide power backscattered by the fiber link under test and supplied via the wavelength division multiplexer, the optical circulator, the variable optical attenuator and/or variable semiconductor optical amplifier to said photo diode which converts the received optical signal into an electrical current evaluated by a processor to calculate the backscattering trace of said fiber link under test.

In a still further possible embodiment of the method according to the first aspect of the present invention if large reflections are identified in the backscattering trace of the fiber link under test, the variable optical attenuator and/or the variable semiconductor optical amplifier are controlled automatically by the processor to limit the power of the optical signal received by said photo diode within the predetermined power range.

The invention further provides according to a second aspect an optical time-domain reflectometer apparatus configured to measure a backscattered trace of a fiber link under test, said optical time-domain reflectometer apparatus comprising:

at least one photo diode adapted to detect an optical signal reflected from points along the fiber link under test in response to an optical test signal generated by a layer of said OTDR apparatus and supplied to said fiber link under test, wherein the reflected optical test signal is attenuated or amplified automatically such that the power of the optical signal received by said photo diode is limited to a predetermined power range.

In a possible embodiment of the OTDR apparatus according to the second aspect of the present invention the reflected signal is adjusted by a variable optical attenuator of said OTDR apparatus and/or by a variable semiconductor optical amplifier of said OTDR apparats under control of a processor of said OTDR apparatus depending on a signal strength of the optical signal received by said photo diode.

In a possible embodiment of the OTDR apparatus according to the second aspect of the present invention the photo diode comprises an avalanche photo diode wherein an avalanche control voltage of the avalanche photo diode is changed automatically by the processor of the OTDR apparatus depending on the signal strength of the optical signal received by said photo diode.

In a further possible embodiment of the OTDR apparatus according to the second aspect of the present invention the photo diode is adapted to convert the received optical signal into an electrical current supplied to the processor of said OTDR apparatus wherein the processor is adapted to evaluate power backscattered by the fiber link under test to provide the backscattering trace of the fiber link under test indicating a spatial distribution of the backscattered power.

In a still further possible embodiment of the OTDR apparatus according to the second aspect of the present invention the laser is adapted to transmit optical pulses via an optical circulator and a wavelength division multiplexer into the fiber link under test to provide power backscattered by the fiber link under test and supplied via the wavelength division multiplexer to the optical circulator of the OTDR apparatus, via a variable optical attenuator and/or via a variable semiconductor optical amplifier to the photo diode which is adapted to convert the received optical signal into an electrical current evaluated by the processor of the OTDR apparatus to calculate the backscattered trace of the fiber link under test.

In a possible embodiment of the OTDR apparatus according to the second aspect of the present invention if large reflections are identified in the backscattering trace of the fiber link under test, the variable optical attenuator and/or the variable semiconductor optical amplifier are controlled automatically by the processor of the OTDR apparatus to limit the power of the optical signal received by the photo diode within the predetermined power range.

BRIEF DESCRIPTION OF FIGURES

In the following possible embodiments of the different aspects of the present invention are described in more detail with reference to the enclosed figures.

DETAILED DESCRIPTION OF EMBODIMENTS

Figure 1:
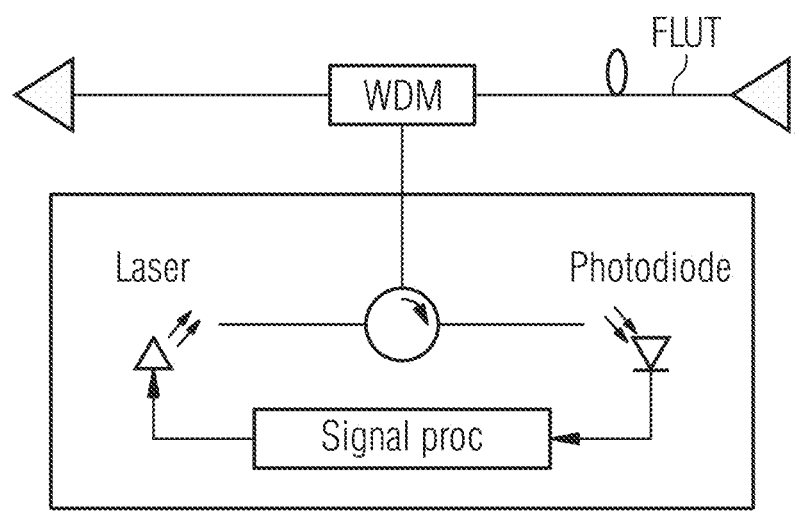
FIG. 1 shows a typical structure of a conventional optical time-domain reflectometer.
Figure 2:
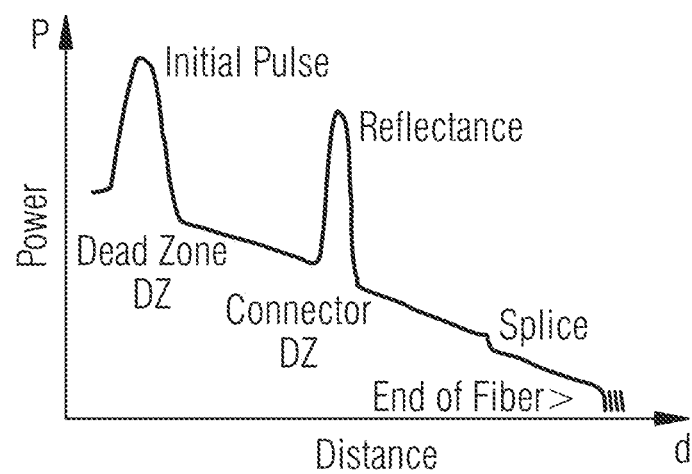
FIG. 2 is a diagram for illustrating a typical backscattered optical signals including dead zones for illustrating a problem underlying the present invention.
Figure 3:
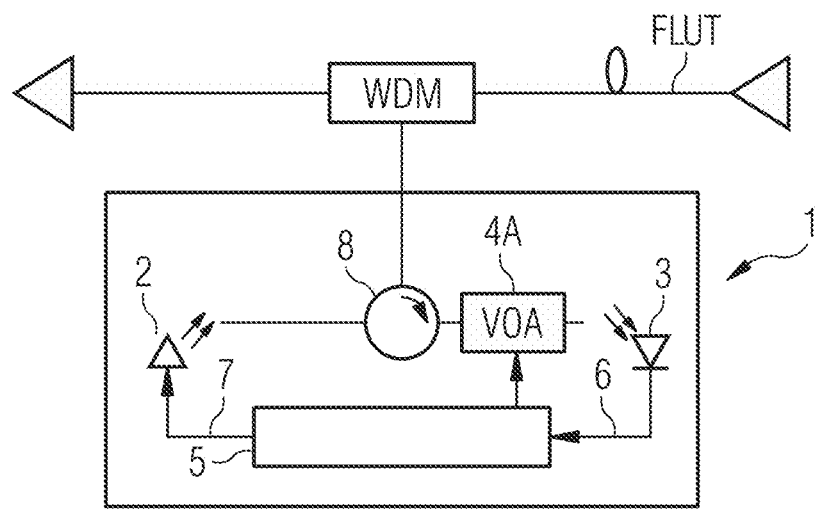
FIG. 3 shows schematically a possible exemplary embodiment of an optical time-domain reflectometer, OTDR, apparatus according to the present invention.

FIG. 3 shows a block diagram of possible exemplary embodiment of an optical time-domain reflectometer, OTDR, apparatus 1 according to an aspect of the present invention. In the illustrated embodiment of FIG. 3 the OTDR apparatus 1 is configured to measure a backscattered trace of a fiber link under test FLUT as illustrated in FIG. 3. The fiber link under test FLUT comprises at least one optical fiber for transmission of optical signals. The OTDR apparatus 1 comprises in the illustrated embodiment a laser 2 which is adapted to generate an optical test signal. This generated optical test signal is supplied to the fiber link under test FLUT. The OTDR apparatus 1 further comprises a photo diode 3 which is adapted to detect an optical signal reflected from the fiber link under test FLUT in response to the optical test signal generated by the laser 2 of the OTDR apparatus 1. In the optical time-domain reflectometer, OTDR, apparatus 1 as illustrated in FIG. 1 the reflected optical test signal is attenuated automatically by an attenuation element such that the power P of the optical signal received by the photo diode 3 is limited to a predetermined power range. In the illustrated embodiment of FIG. 3 the attenuation element is formed by a variable optical attenuator (VOA) 4A. The signal attenuation element 4A of the OTDR apparatus 1 controlled in the illustrated embodiment by a processor 5 of the OTDR apparatus 1. The reflected signal is adjusted by the variable optical attenuator 4A under control of the processor 5 depending on a signal strength of the optical signal received by the photo diode 3 of the OTDR apparatus 1. The output of the photo diode 3 is connected to an input of the signal processor 5 via signal line 6 as illustrated in FIG. 3. Further the signal processor 5 is adapted to control the laser 2 via a control line 7. The photo diode 3 is adapted to convert the received optical signal into an electrical current which can be supplied to the signal processor 5 in a signal line 6. The processor 5 is adapted to evaluate the power backscattered by the fiber link under test FLUT to provide a backscattering trace of the fiber link under test FLUT indicating a spatial distribution of the backscattered power. The laser 2 of the OTDR apparatus 1 is adapted to transmit optical pulses via an optical circulator 8 and a wavelength division multiplexer (WDM) 9 into the fiber link under test FLUT to provide power backscattered by the fiber link under test. The signal backscattered by the fiber link under test FLUT is supplied via the wavelength division multiplexer 9 to the optical circulator 8 of the OTDR apparatus 1. From there the backscattered optical signal is supplied via the variable optical attenuator 4A to the photo diode 3 which is adapted to convert the received optical signal into an electrical current which is then evaluated by the processor 5 of the OTDR apparatus 1 to calculate the backscattering trace of the fiber link under test FLUT. If large reflections are identified in the backscattering trace of the fiber link under test FLUT a variable optical attenuator 4A is controlled by the processor 5 to limit the power of the optical signal received by the photo diode 3 within the predetermined power range.

In the illustrated embodiment of FIG. 3 the OTDR apparatus 1 comprises a component or element adapted to attenuate the reflected optical signal such that the power of the signal received by the following photo diode is limited to a predetermined power range. In the illustrated specific embodiment of FIG. 3 the attenuation component is formed by a variable optical attenuator 4A. The variable optical attenuator 4A is controlled by the processor 5.

Figure 4:
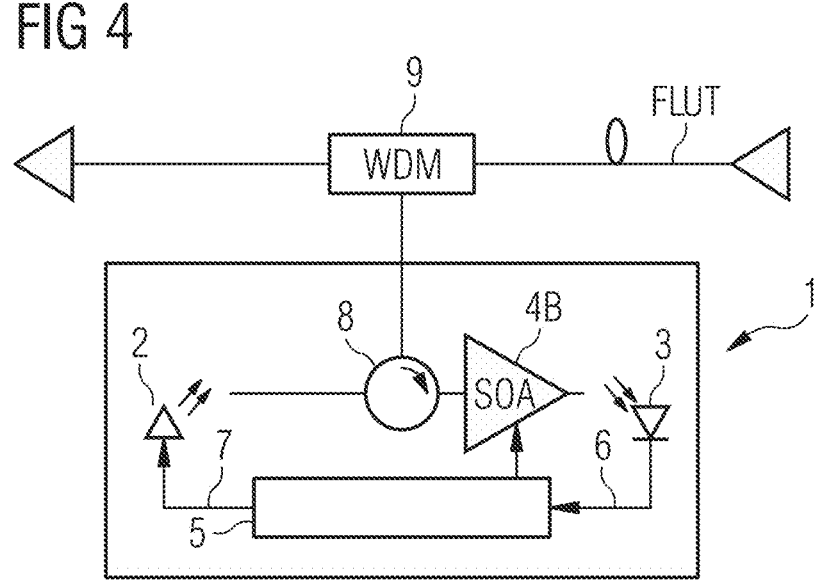
FIG. 4 shows a schematic diagram of a further possible exemplary embodiment of an optical time-domain reflectometer, OTDR, apparatus according to an aspect of the present invention.

FIG. 4 shows a further possible embodiment of an OTDR apparatus 1 according to the present invention configured to measure a backscattered trace of a fiber link under test FLUT. In the illustrated embodiment of FIG. 4 the reflected optical signal is amplified such that the power P of the optical signal received by the photo diode 3 is limited to a predetermined power range. In the embodiment of FIG. 4 the reflected optical test signal is amplified via a signal amplification unit. In the specific embodiment of FIG. 3 the signal amplification unit is formed by a variable semiconductor optical amplifier (SOA) 4B. In a possible embodiment the gain of the variable semiconductor optical amplifier 4B is controlled by the processor 5 depending on the signal strength of the optical signal received by the photo diode 3.

In both embodiments of FIG. 3, 4 the predetermined power range comprises an upper power limit and a lower power limit. The predetermined power range comprises as an upper power limit a maximum power $P_{max}$ which is adjusted to suppress dead zones DZ within the backscattered trace of the fiber link under test FLUT caused by saturation of the photo diode 3 in response to the optical signal received by the photo diode 3. The predetermined power range further comprises as a lower power limit a minimum power $P_{min}$ which is adjusted to maintain a minimum signal to noise ratio STNR of the optical signal received by the photo diode 3. In a possible embodiment an attenuation of the variable optical attenuator (VOA) 4A as illustrated in FIG. 3 and/or a gain of a semiconductor optical amplifier (SOA) 4B as illustrated in FIG. 4 is adjusted iteratively by the processor 5 depending on a backscattered power P to maintain the power of the optical signal received by the photo diode 3 approximately constant within the predetermined power range. In a possible embodiment the photo diode 3 of the OTDR apparatus 1 can comprise an avalanche photo diode APD wherein an avalanche control voltage of the avalanche photo diode APD is changed automatically depending on the signal strength of the optical signal received by the photo diode 3. In a possible embodiment a control voltage and/or a control current of the photo diode 3 can be controlled by the processor 5 of the OTDR apparatus 1 depending on the signal strength of the optical signal received by the photo diode 3. Accordingly in a possible embodiment not only the variable optical attenuator (VOA) 4A as shown in FIG. 3 and the variable semiconductor optical amplifier (SOA) 4B as shown in FIG. 4 is controlled by the signal processor 5 but also a control voltage and/or a control current of the photo diode 3 is controlled to increase the performance and measurement quality of the OTDR apparatus 1. If larger reflections are identified in the backscattering trace of the fiber link under test FLUT the variable optical attenuator 4A and/or the variable semiconductor optical amplifier 4B as well as the control voltage and/or the control current of the photo diode 3 can be controlled in a possible embodiment automatically by the processor 5 to limit the power of the optical signal received by the photo diode 3 and to increase performance of the measurement of the backscattered trace of the fiber link under test FLUT.

The power range received on the photo diode 3 is limited to be less than a maximum value in order to avoid saturation of the photo diode 3. On the other hand the power P received on the photo diode 3 will not be less than a minimum value to maintain a sufficient signal to noise ratio after the photo diode 3. The range between the minimum and maximum power value can be in a possible embodiment less than approximately 10 dB. The absolute power values of the optical signal received by the photo diode 3 can depend on the type of the used photo diode 3. For a PIN photo diode a power range of −20 to −10 dBm can be used for example while an avalanche photo diode (APD) can comprise a power range of −30 to −20 dBm.

In the OTDR apparatus 1 as illustrated in the embodiments of FIG. 3, 4 a variable optical attenuator 4A and/or a variable semiconductor optical amplifier 4B is placed in front of the photo diode 3. This allows to attenuate strong optical pulses and/or the reduction of an avalanche voltage of the APD diode while receiving strong optical pulse. By the use of the variable optical attenuator 4A and/or the semiconductor optical amplifier 4B one can prevent a strong optical signal from reaching the photo diode 3 while changing the avalanche voltage prevents the photo diode 3 from generating too many electrons and becoming saturated.

In a possible embodiment the gain of the variable semiconductor optical amplifier 4B and/or the attenuation of the variable optical attenuator 4A can be flexibly controlled by the signal processor 5 of the OTDR apparatus 1. Both, the gain and/or the attenuation as well as the point in time when the gain and/or attenuation is applied can be controlled by the processor 5. Variable semiconductor optical amplifiers (SOA) and variable optical attenuators (VOA) comprise a typical response time in the order of nanoseconds. This enables the suppression of a strong reflection and allows, after increasing the gain and reducing the attenuation within a few nanoseconds, to receive a signal backscattered shortly (e.g. 10 cm) after a strong reflection. The roundtrip propagation time of an optical signal in the fiber link under test FLUT can be for instance approximately 10 ns for a fiber length of 1 m. Further the use of the variable optical attenuator 4A and/or the variable semiconductor optical amplifier 4B before the photo diode 3 allows to dynamically increase the optical gain or to reduce the optical loss over time to receive an optical signal with a more constant power at the photo diode 3 as the backscattering is received from points further down the fiber link under test FLUT. This leads to a more constant signal to noise ratio STNR and a higher measurement quality of the OTDR apparatus 1.

Instead of a variable optical attenuator (VOA) 4A as shown in FIG. 3 adapted to attenuate the received optical signal a semiconductor optical amplifier (SOA) 4B as illustrated in FIG. 4 can be inserted between the circulator 8 and the photo diode 3. While normal operation an electrical pump current is supplied to the variable semiconductor optical amplifier 4B resulting in a gain for the optical signal power. Further a reverse bias voltage or current can be applied to the SOA 4B resulting in signal attenuation. This way, a swing between a gain in the order of 20 dB to an attenuation of 30 dB can be achieved in a possible specific embodiment. The switching speed of the SOA 4B is on the same order as the switching speed for a VOA 4A. In a possible embodiment the OTDR apparatus 1 according to the present invention an additional optical bandpass filter can be used to reduce the signal noise added during amplification of the optical signal.

Further in a possible embodiment a multiplication gain of the avalanche photo diode 3 can be modified by the signal processor 5 based on the detected signal. By reducing the voltage applied to the avalanche stage of the photo diode 3 a gain factor can be reduced, leading to less saturation of the avalanche photo diode 3. However, a rather high voltage needs to be modified, requiring more effort than a lower bias voltage or injection current. Furthermore, the APD bias modulation speed is typically lower than for the variable semiconductor optical amplifier SOA or the variable optical attenuator VOA.

In a possible embodiment a suppression of a dead zone DZ can be performed as follows. First, optical pulses generated by the laser 2 can be transmitted as in a regular operation with a constant attenuation of the VOA 4A and/or a constant gain of the SOA 4B or APD 3. In a further step the resulting trace is evaluated and large reflections are identified. At those points in time measured from the time of pulse transmission, where reflections are observed, short (~1 ns) attenuation pulses can be supplied to the VOA 4A and/or the bias voltage/current to the APD 3/SOA 4B is reduced for a short time period. Then the backscattering traces are remeasured. By repeating these steps further dead zones DZ can be identified and eliminated.

In a possible embodiment more information about a relative position of two largely different reflections can also be gained by slightly shifting the attenuation pulse, by measuring the resulting reflected power and by comparing the different backscattering traces.

An additional function can be provided by the SOA 4B and/or by the VOA 4A. As the backscattered signal power is reduced along the fiber link under test FLUT, the later arriving backscattered signals will have a lower power than those arriving earlier, stemming from the first fiber sections. This does result in noisier signals and a longer required measurement time. A large constant gain, on the other hand, can saturate the photo diode 3 for the signals form the first fiber sections.

The SOA 4B is used to add a well-defined gain variation over time, such that the later arriving signals are amplified more and therefore are less noisy. This can increase the measurement accuracy of the OTDR apparatus 1 and thus reduce the time required for a measurement.

In a possible embodiment the gain of the SOA 4B as illustrated in FIG. 4 can be adapted by changing the SOA pump power over time to yield an approximately constant SOA output power and therefore an approximately constant input power of the optical input signal received by the photo diode 3. This adaption of the SOA gain $G_{SOA}$ can be performed in a specific embodiment as follows.

First, the SOA gain G of the SOA 4B is set to a predetermined constant value $G_0$, and the backscattered trace is measured with a few averages:

$$P_{pd0(t)} = P_{in0(t)} \times G_0$$

Then the measured trace is inverted and the required SOA gain time function is stored to achieve a target power on the photo diode as the inverse of the backscattered power:

$$G_{1(t)} = G_0 \times P_{pd,target}/P_{pd0(t)}$$

Then the gain time function $G_{1(t)}$ is applied to the SOA 4B by applying an appropriate pump current function and the backscattered power $P_{in1(t)}$ is recorded for the following traces. The received power on the photo diode 3 is then:

$$P_{pd1(t)} = G_{1(t)} \times P_{in1(t)}$$

If the resulting power $P_{pd1(t)}$ has still too large variations the received trace is again inverted and the resulting required SOA gain is stored as $$G_{2(t)} = G_{1(t)} \times P_{pd,target}/P_{pd1(t)}.$$

Then the gain function $G_{2(t)}$ is applied to the SOA 4B to record the backscattered power $P_{in2(t)}$ for the following traces. The received power at the photo diode 3 is:

$$P_{pd2(t)} = G_{2(t)} \times P_{in2(t)}.$$

The last steps can be repeated if necessary.

The actual backscattered power curve is finally obtained after sufficient averages, from the measured received power on the photo diode $P_{pd(t)}$ and the gain time function of the SOA 4B $G_{(t)}$ as:

$$P_{scatt(t)} = P_{pd(t)}/G_{(t)}.$$

Figure 5A:
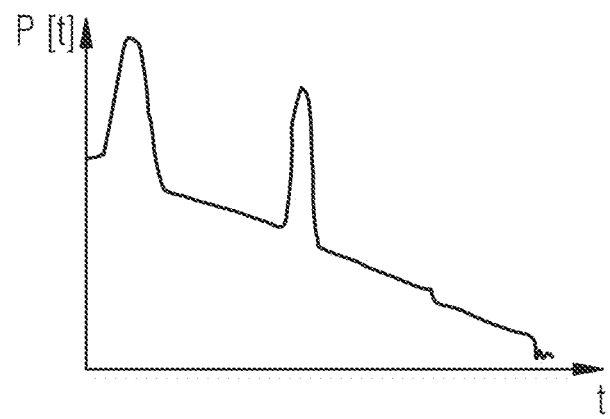
FIG. 5A, 5B, 5C show diagrams for illustrating a possible exemplary embodiment of a method and apparatus according to the present invention.
Figure 5B:
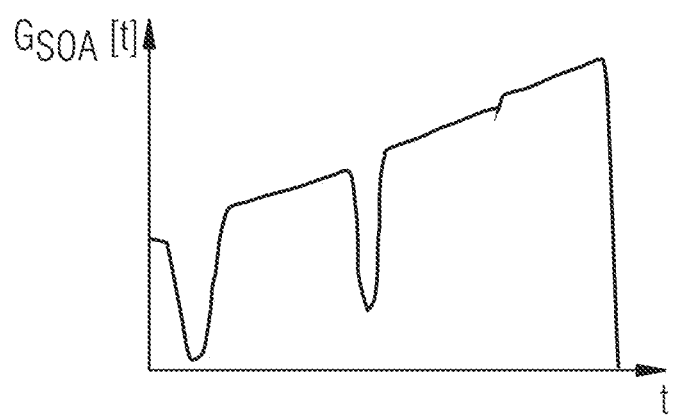
Figure 5C:
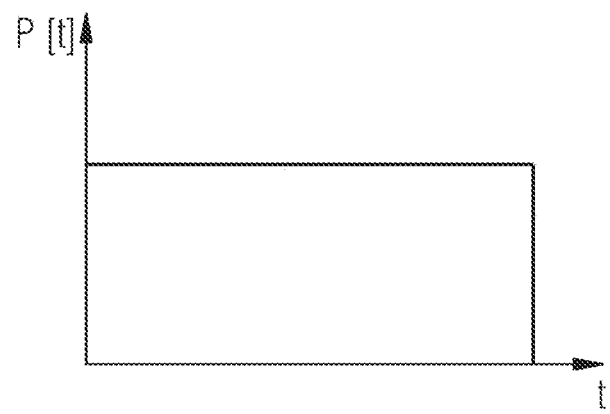

FIGS. 5A, 5B, 5C illustrate a possible operation of a specific embodiment of an OTDR apparatus 1 according to the present invention.

FIG. 5A shows the power $P_{(t)}$ backscattered from a fiber link under test FLUT as a response to a probe pulse. To reduce the signal noise on this curve this is assumed to be an average of several recordings.

FIG. 5B shows the inverted top curve of FIG. 5A. This represents the gain $G_{(t)}$ to be applied by the SOA 4B. In the illustrated figures the y-axis is given in logarithmic values. Inverting the power function therefore corresponds to a mirroring on a horizontal line.

FIG. 5C shows a constant power value of the signal power of the optical signal after the SOA 4B received by the photo diode 3 being as the product of the power $P_{(t)}$ illustrated in FIG. 5A and the gain curve $G_{(t)}$ illustrated in FIG. 5B.

In an alternative embodiment instead of a full inversion of the received power the SOA gain G of the SOA 4B can be adapted in discrete steps of e.g. of 5 dB. This is illustrated by the diagrams of FIGS. 6A, 6B, 6C.

Figure 6A:
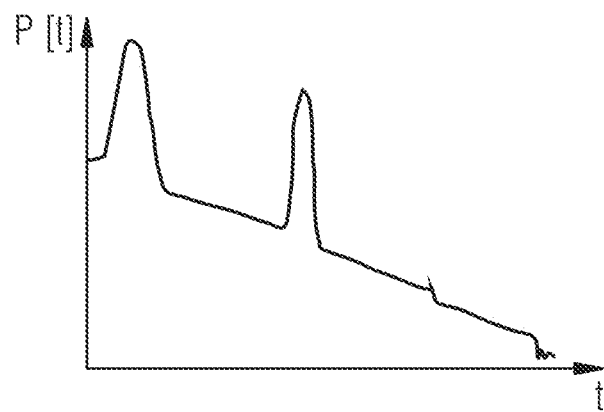
FIG. 6A, 6B, 6C show further diagrams for illustrating a further possible exemplary embodiment of a method and apparatus according to the present invention.

FIG. 6A shows the backscattered power P from a fiber link under test FLUT as a function of time.

Figure 6B:
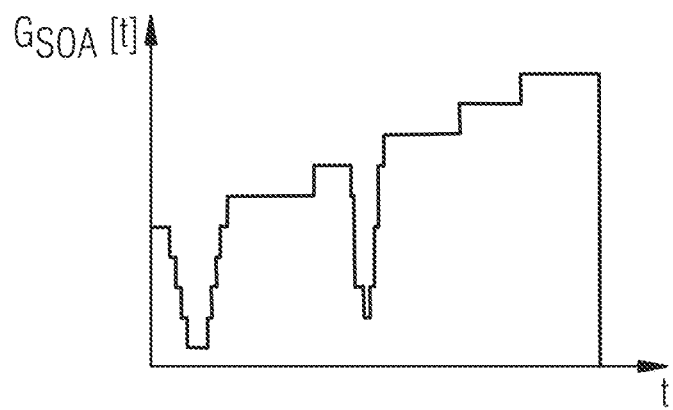

FIG. 6B shows the SOA gain function of the SOA 4B obtained from an inversion of the power curve with limited granularity.

Figure 6C:
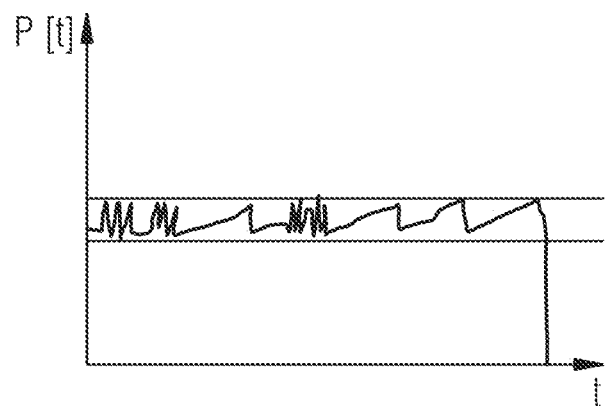

FIG. 6C illustrates the resulting product of power and SOA gain. The resulting power after the SOA ($P_{pd(t)}$) is not constant but varies within a range of approximately the gain step size (i.e. 5 dB in the given example).

The invention claimed is:

1. A method for measuring a backscattered trace of a fiber link under test in response to an optical test signal generated by a laser of an optical time-domain reflectometer apparatus supplied to said fiber link under test, wherein the optical test signal is reflected back from points along said fiber link under test and received by a photo diode of said OTDR apparatus, wherein the reflected optical signal is attenuated by a variable optical attenuator and/or amplified by a variable semiconductor optical amplifier of said OTDR apparatus which are controlled by a processor of said OTDR apparatus depending on the signal strength of the optical signal received by said photo diode such that the power of the optical signal received by said photo diode is limited to a predetermined power range, and
wherein the predetermined power range comprises as a lower power limit a minimum power which is adjusted to maintain a minimum signal to noise ratio of the optical signal received by said photo diode.

2. The method according to claim 1 wherein the predetermined power range comprises as an upper power limit a maximum power which is adjusted to suppress dead zones within the backscattered trace of the fiber link under test caused by saturation of the photo diode in response to the optical signal received by said photo diode.

3. The method according to claim 1, wherein an attenuation of the variable optical attenuator and/or a gain of the semiconductor optical amplifier is adjusted iteratively depending on a backscattered power to maintain the power of the optical signal received by said photo diode constant within the predetermined power range.

4. The method according to claim 1 wherein a control voltage and/or a control current of the photo diode is controlled depending on the signal strength of the optical signal received by said photo diode.

5. The method according to claim 4 wherein the photo diode comprises an avalanche photo diode, wherein an avalanche control voltage of the avalanche photo diode is changed automatically depending on the signal strength of the optical signal received by said photo diode.

6. The method according to claim 1 wherein the photo diode converts the received optical signal into an electrical current supplied to the processor which evaluates power backscattered by the fiber link under test to provide the backscattered trace of the fiber link under test indicating a spatial distribution of the backscattered power.

7. The method according to claim 3 wherein optical pulses are transmitted from the laser via an optical circulator of said OTDR apparatus and a wavelength division multiplexer into the fiber link under test to provide power backscattered by the fiber link under test and supplied via the wavelength division multiplexer, the optical circulator, the variable optical attenuator and/or variable semiconductor optical amplifier to said photo diode which converts the received optical signal into an electrical current evaluated by the processor to calculate the backscattering trace of said fiber link under test.

8. The method according to claim 7 wherein if large reflections are identified in the backscattering trace of the fiber link under test, the variable optical attenuator and/or the variable semiconductor optical amplifier are controlled automatically by the processor to limit the power of the optical signal received by said photo diode within the predetermined power range.

9. An optical time-domain reflectometer, apparatus configured to measure a backscattered trace of a fiber link under test, said OTDR apparatus comprising:
at least one photo diode adapted to detect an optical signal reflected from points along the fiber link under test in response to an optical test signal generated by a laser of said OTDR apparatus and supplied to said fiber link under test, wherein the reflected optical test signal is attenuated by a variable optical attenuator and/or amplified automatically by a variable optical amplifier of said OTDR apparatus, which are controlled by a processor of the OTDR apparatus depending on a signal strength of the optical signal received by the photo diode such that the power of the optical signal received by said photo diode is limited to a predetermined power range, and
wherein the predetermined power range comprises as a lower power limit a minimum power which is adjusted to maintain a minimum signal to noise ratio of the optical signal received by said photo diode.

10. The OTDR apparatus according to claim 9 wherein the photo diode comprises an avalanche photo diode and wherein an avalanche control voltage of the avalanche photo diode is changed automatically by said processor of the OTDR apparatus depending on the signal strength of the optical signal received by said photo diode.

11. The OTDR apparatus according to claim 9 wherein the photo diode is adapted to convert the received optical signal into an electrical current supplied to the processor of said OTDR apparatus and wherein the processor is adapted to evaluate power backscattered by the fiber link under test to provide the backscattering trace of the fiber link under test indicating a spatial distribution of the backscattered power.

12. The OTDR apparatus according to claim 9 wherein the laser is adapted to transmit optical pulses via an optical circulator of said OTDR apparatus and a wavelength division multiplexer into the fiber link under test to provide power backscattered by the fiber link under test and supplied via the wavelength division multiplexer to the optical circulator of the OTDR apparatus, via the variable optical attenuator and/or via the variable semiconductor optical amplifier to the photo diode which is adapted to convert the received optical signal into an electrical current evaluated by the processor of the OTDR apparatus to calculate the backscattering trace of the fiber link under test.

13. The OTDR apparatus according to claim 9 wherein if large reflections are identified in the backscattering trace of the fiber link under test, the variable optical attenuator and/or the variable semiconductor optical amplifier are controlled automatically by the processor of the OTDR apparatus to limit the power of the optical signal received by said photo diode within the predetermined power range.

* * * * *